United States Patent [19]

Suomala et al.

[11] Patent Number: 4,554,000
[45] Date of Patent: Nov. 19, 1985

[54] MOLTEN GLASS SPOUT BOWL REFRACTORY TUBE SUPPORT MECHANISM AND METHOD OF CONTROL

[75] Inventors: John E. Suomala, Weatogue; Kenneth L. Bratton, Windsor, both of Conn.; Sten E. Bergsten, Sundsvall, Sweden; Nicolas M. Savic, Wethersfield; E. Boyd Gardner, Bloomfield, both of Conn.

[73] Assignee: Emhart Industries, Inc., Farmington, Conn.

[21] Appl. No.: 655,502

[22] Filed: Sep. 27, 1984

[51] Int. Cl.[4] .............................................. C03B 5/26
[52] U.S. Cl. ...................................... 65/129; 65/328; 65/330; 65/332; 65/180
[58] Field of Search ................. 65/129, 328, 330, 332, 65/331, 180

[56] References Cited

U.S. PATENT DOCUMENTS

| | | | |
|---|---|---|---|
| 1,735,837 | 11/1929 | Peiler | 65/180 |
| 1,760,254 | 5/1930 | Peiler | 65/330 X |
| 2,310,290 | 2/1943 | Honiss | 65/129 |
| 2,479,121 | 8/1949 | Koleda | 65/330 |
| 2,707,354 | 5/1955 | Peiler | 65/330 |
| 2,993,302 | 7/1961 | Soubier | 65/129 |
| 3,248,204 | 4/1966 | Tyner | 65/330 |
| 4,514,209 | 4/1985 | Mumford | 65/328 |

Primary Examiner—Arthur Kellogg
Attorney, Agent, or Firm—McCormick, Paulding & Huber

[57] ABSTRACT

A swing out support frame is provided on X-Y slide support structure such that one of several different diameter refractory tubes can be supported in a fixed spout bowl for rotation inside the bowl, and also for electrically controlled and non-electrically dependent vertical movement of the tube inside the bowl.

29 Claims, 13 Drawing Figures

MOLTEN GLASS SPOUT BOWL REFRACTORY TUBE SUPPORT MECHANISM AND METHOD OF CONTROL

CROSS REFERENCE TO RELATED APPLICATIONS

This application is related to a pending application entitled "Electronic Glass Feeder Plunger Operating Mechanism" in the name of Robert J. Duga, Constantine Kulig, Robert L. Doughty, Robert J. Douglas and Robert P. Anderson, filed on June 4, 1984 under Ser. No. 616,638 and assigned to the assignee herein.

BACKGROUND OF THE INVENTION

Glass spout bowls are generally provided on the end of an elongated forehearth channel where molten glass is heated and conveyed to the bowl for the formation of gobs of glass which are then directed to several molds in a modern glassware forming machine. The bowl is generally mounted on fixed structure at the discharge end of the glass forehearth and a feeder mechanism is provided in the bowl to issue glass gobs from orifices defined in the lower portion of the feeder bowl. A typical feeder mechanism includes one or more vertically reciprocable plungers operated in cooperation with shears and other feeder components in order to control the manner in which the gobs are formed for gravity feed to the various sections of a typical glassware forming machine.

A typical feeder may include one or more plungers, each of which may be axially aligned above an associated orifice in the bottom of the spout bowl and through which orifice the molten glass is adapted to issue. The gob is sheared by reciprocating shear blades and the operation of the shears and plungers is synchronized with the operation of the glassware forming machine so that these mechanisms operate cyclically in accordance with a predetermined timing sequence.

When the glass flow is to be shut down for some reason, and the plungers are no longer reciprocated to form glass gobs, conventional practice provides for the tube inside the spout bowl to be seated on an annular surface defined for this purpose inside the bowl in order that no more molten glass can issue from the orifices in an orifice plate structure provided in the lower portion of the feeder bowl. Conventional practice also calls for the rotation of such a tube continuously during normal operation of the feeder bowl with the distance between the lower end of the tube and the above mentioned annular seat defined in the spout bowl is kept at a predetermined spacing for optimum flow of glass to the reciprocating plungers.

The above mentioned copending patent application deals with an improved plunger operating mechanism wherein a reversible electric motor is connected to drive a plunger support in a cyclically reciprocating manner, and wherein a programmable control means operably coupled to the motor causes such oscillation between predetermined limits and according to a predetermined motion profile. The support bracket is cantilevered so that the reversible motor operates between fixed structure associated with the frame at the discharge end of the glass forehearth. The plunger support bracket mounting means includes the capability for adjustably positioning the plungers relative to the spout bowl (itself attached to the front end of the forehearth) so that the plungers can be aligned with the orifices in the orifice plate itself.

Although refractory tubes have been provided in spout bowl surrounding vertically reciprocating plungers for the general purpose as stated above, the present invention relates to an improved mounting structure for such refractory tube in a spout bowl environment. The refractory tube is so constructed and arranged that it can be removed for replacement and repair by the refractory tubes of different size in the same support mechanism. Furthermore, the support mechanism itself is more efficiently designed to accommodate adjustments in a horizontal plane with the same results as achieved for such adjustments of the plunger support mechanism as described above.

Another advantage to the refractory tube support mechanism described herein relates to its uniquely balanced construction such that a relatively small electric stepping motor can be utilized to raise and to lower the refractory tube and said support mechanism. A digital display is provided to facilitate setting up the feeder mechanism following a shut down. All of the aforementioned advantages are realized in a refractory tube support mechanism which also provides for rotation of the tube itself during normal operation of the feeder.

Finally, the tube support mechanism is mounted on a single vertically extending pivot post such that the balanced support frame (after removal of the refractory tube chucking system) can be swung to either side in order to facilitate working on the spout bowl itself or on the refractory tube support mechanism. The refractory tube is so arranged in its chucking mechanism that the tube can be readily removed from its position inside the spout bowl with a minimum of time and effort required to disengage the chucking mechanism from the balanced frame while the frame is located in position over the spout bowl.

SUMMARY OF THE INVENTION

The foregoing objects and advantages of the invention are achieved in the preferred embodiment disclosed herein which provides in the environment of a molten glass spout bowl means for mounting the refractory tube support mechanism from the fixed frame structure normally provided at the discharge end of a glass forehearth. The spout bowl has a conventional orifice defining means provided in its lower surface, preferably in the form of an orifice plate. Plungers are provided inside the spout bowl for vertical motion in cooperation with these orifices to form gobs of glass in accordance with conventional practice. The refractory tube support mechanism described herein provides at least one tube surrounding at least one such plunger and having a lower end of the tube adapted to mate with an annular seating surface inside the spout bowl in order to interrupt the flow of glass to the orifice defining means and vertically reciprocating plunger lower ends. A horizontally extending frame is provided for so supporting the refractory tube and a vertically extending pivot post is provided for the this frame. Support structure associated with the fixed structure of the glass forehearth so mounts the frame that the frame can be moved in a horizontal swinging movement on the axis of this pivot post to and from an active position. Clamping means defined in part on this fixed forehearth structure and in part on the frame serves to hold the frame in its active position. A stepping motor is provided to move the frame down and up relative to this support structure.

The refractory tube is provided with an integrally formed radially outwardly extending flange adjacent its upper end, and the flange preferably has a conically shaped locating surface defined thereon. Annular tube chucking means is provided with inner and outer parts one of which has a conical locating surface that mates with that on the tube flange and means is provided for axially clamping these inner and outer tube chucking means parts. The electric stepping motor and an associated vertically extending jack screw are provided on a first horizontally adjustable slide which slide is in turn provided on a second horizontally adjustable slide to permit adjustments to be made to the vertical axis of the tube relative to the fixed central axis of the spout bowl. This permits the tube to be properly aligned with the plungers and with the orifice in the spout bowl so as to achieve optimum operation.

DETAILED DESCRIPTION

Figure 1:
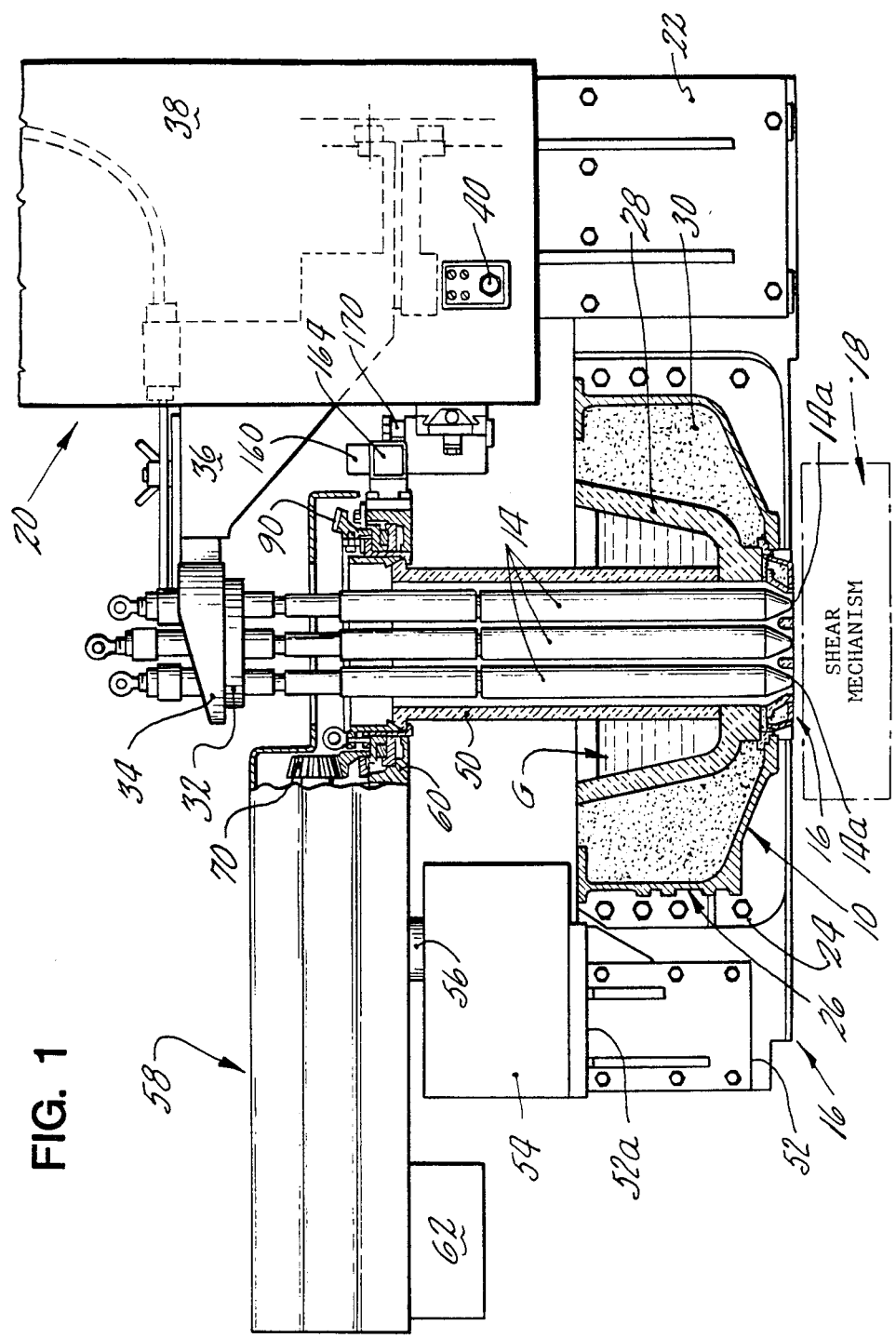
FIG. 1 shows a front elevational view partly in cross section of a spout bowl with mechanism for supporting the plungers and also for supporting the refractory tubes surrounding the plungers.

Turning now to the drawings in greater detail, FIG. 1 shows generally in elevation and partly in vertical section a spout bowl 10 conventionally mounted to the discharge end of a glass forehearth channel 12. This forehearth channel 12 is adapted to feed molten glass toward the observer in FIG. 1 and into the spout bowl so that glass to some level indicated generally at G is provided in the spout bowl. The direction of flow of the glass in the forehearth channel will be referred to as the X direction in the decription to follow. The Y direction is perpendicular to the X direction and also is defined in a horizontal plane as suggested by the arrow Y in FIG. 1.

As described to some extent in the copending patent application referred to previously a feeder mechanism includes at least one vertically reciprocating plunger 14, and as shown three such plungers are provided in the feeder bowl such that their lower ends 14a, 14a cooperate with orifice defining means in the form of orifice plates 16 so that these plungers aid in the flow of glass downwardly through these orifices. The glass stream is sheared by mechanism 18 of conventional construction and operation to be fed into the individual sections of a typical glassware forming machine.

The plunger operating mechanism 20 is mounted by means of an angle bracket 22 to fixed structure at the discharge end of the glass forehearth as described in the above mentioned patent. In accordance with conventional practice the spout bowl itself is also mounted to the discharged end of the glass forehearth as suggested by the plate 24 which is bolted thereto as shown in FIG. 1. The spout bowl includes a peripherally extending gib defining means to which may be mounted the shear mechanism 18 in certain feeder configurations. The spout bowl includes an inner refractory portion 28 which contains the glass G and an insulated portion 30 between the refractory bowl 28 and the metal gib defining frame 26. As described in some detail in the above mentioned patent the plungers 14, 14 are secured to plunger chucks that are in turn provided on a plunger carrier disc 32 which disc is in turn provided in a frame 34 in turn secured to laterally extending support bracket 36. Actuating means is provided for moving the support bracket 36 vertically in timed relationship with other components of the glassware forming machine (not shown) and the means for reciprocating the plungers is contained in housing 38. As also described in said pending patent application means is provided for adjustably positioning the plungers 14, 14 and their associated support bracket 36 in both the X and Y directions by means of X and Y slides and cross slides as shown generally in at 40. The reader is referred to said pending patent application for a more detailed description of this portion of the overall feeder apparatus depicted in FIG. 1.

FIG. 1 also shows a novel support mechanism for the refractory tube 50 which surrounds the plungers 14, in the spout bowl 10. This invention is directed specifically toward the mechanism for so supporting the tube 50 and for providing said refractory tube with convenient removal means adapted to accommodate refractory tubes of different diameter, as well as providing a unique support structure for the refractory tube chucking device itself whereby this support can be swung away to either side to permit workmen to gain access to the spout bowl, and/or to permit working on the tube support mechanism and its associated structure. This movable tube support includes means for raising and lowering the refractory tube in order to move the tube from the position shown wherein its lower end is seated on an annular seating surface inside the refractory spout bowl 28, wherein the flow of glass G is prevented from reaching the orifices defined in the lower portion of the spout bowl. As a result of raising this refractory tube 50 upwardly an annular opening is provided between the lower end of the tube 50 and the annular seating surface defined for this purpose inside the refractory bowl 28 so that molten glass may flow downwardly around the plungers and through the orifices as it is encouraged to do so by the reciprocating plungers 14, 14.

Still with reference to FIG. 1 an angle bracket 52 similar to 22 is provided on the fixed front end structure at the discharge end of the glass forehearth, being secured thereto by bolts as shown in FIG. 1. This bracket 52 is generally L-shaped and has a horizontally extending leg 52a which provides a convenient support for housing 54 in which is provided the means for electrically and manually raising and lowering the refractory tube 50 as well as the means for adjustably positioning the refractory tube in both the X and Y directions in much the same manner as provided for so positioning the plungers as alluded to above with reference to reference 40 in FIG. 1.

Figure 4:
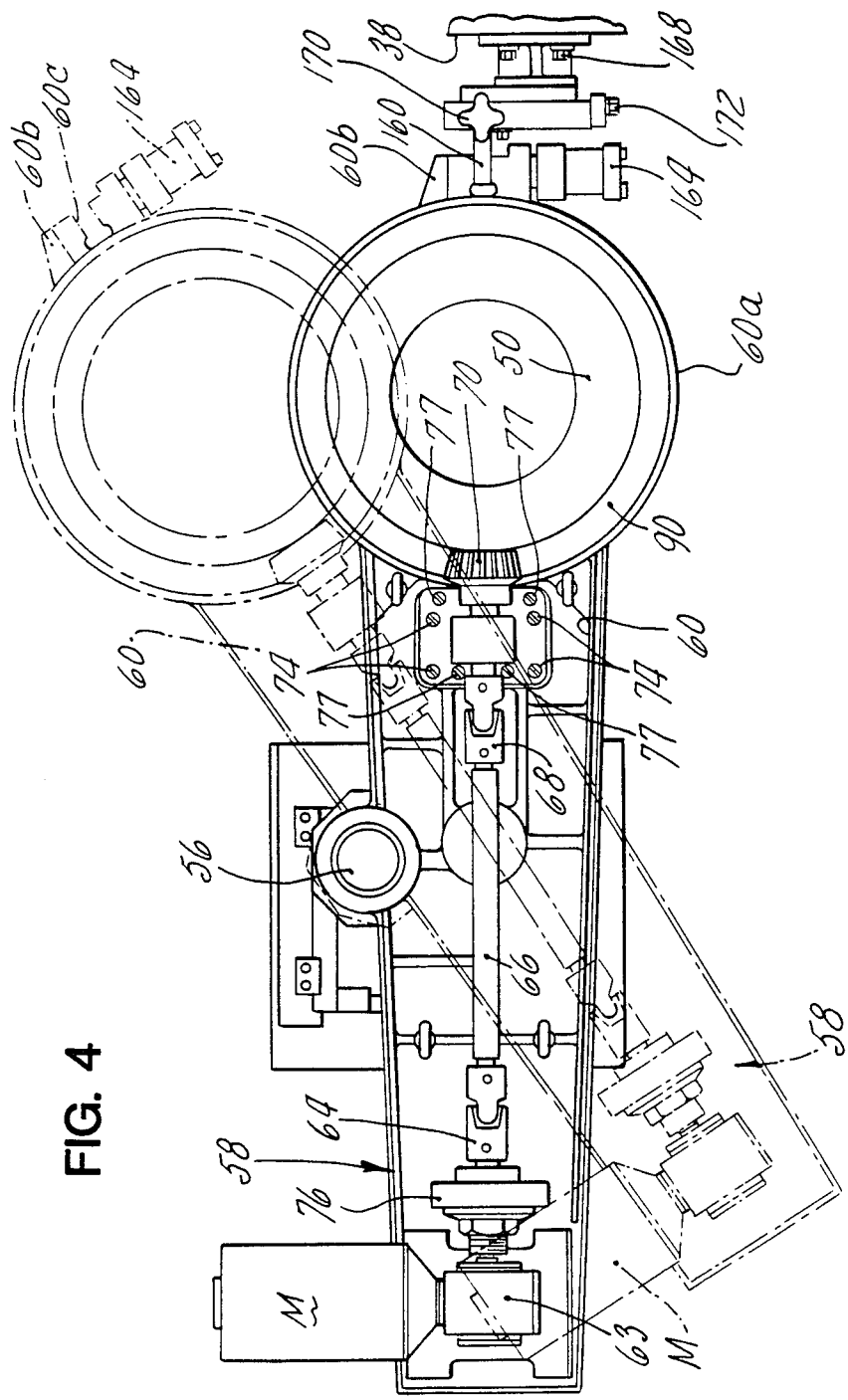
FIG. 4 is a plan view of the refactory tube support mechanism and illustrates in full lines the active position for the frame, the phantom line position illustrating the frame pivoted out of the active position through approximately 35 degrees.

A vertically extending pivot post 56 extends upwardly through the top of housing 54 and serves to support a horizontally extending housing 58 which housing is in turn secured in a banjo shaped frame 60. The frame 60 extends horizontally on both sides of the pivot post 56 and defines a bearing such that this frame 60 is pivotably supported on this post and also movable vertically thereon. The frame 60 is shown in some detail in FIG. 4 which will be referred to hereinafter, and FIG. 4 does show the inward position for the frame 60 and its associated housing 58 and all the components contained therein. The frame 60 can also be pivoted in the opposite direction (not shown). Since the refractory tube 50 is quite heavy and is located some distance from the axis of rotation of the pivot support post 56 a counterweight 62 is provided opposite the refractory tube 50 being hung on the frame 60 so as to balance the entire structure and facilitate raising and lowering of this entire structure as required to control the flow of glass through a stepping motor SM best shown in FIG. 2. A drive motor M is provided immediately above counterweight 62 as best shown in FIG. 4 to assist in balancing the weight of the refractory tube and this drive motor M serves to rotate the refractory tube 50 during normal operation of the feeder through a flexible coupling and shaft arrangement to be described, and illustrated at 64, 66 and 68 in FIG. 4. As shown in FIG. 1 these flexible coupling elements serve to rotate a bevel gear 70 which bevel gear in turn meshes with an ring gear 90 provided for this purpose in axial alignment with the refractory tube 50 such that when this ring gear 90 rotates the tube 50, in the spout bowl.

Figure 8:
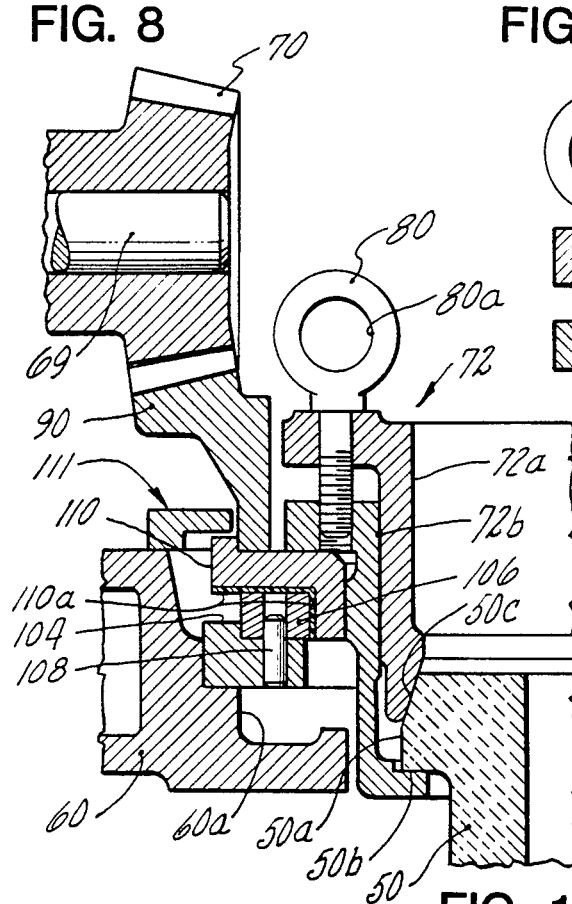
FIG. 8 is a vertical section through the upper end of the refractory tube illustrating one of the three eye-bolts used to lift the refractory tube and its chucking means out of the its active position and to illustrate the clamping means for the refractory tube. This view is taken generally on the line 8—8 of FIG. 3.
Figure 10:
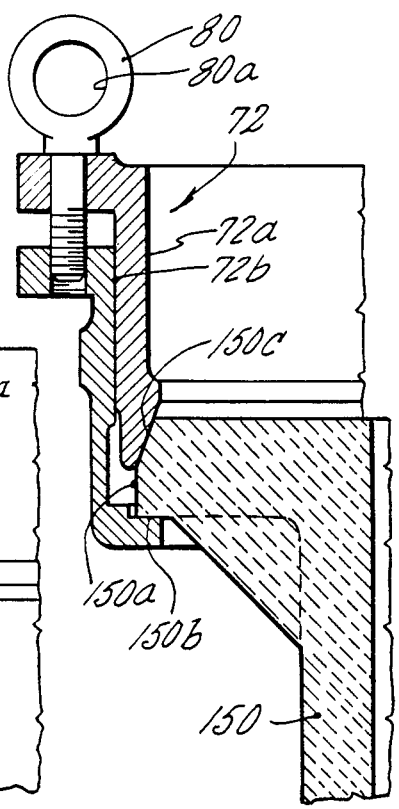
FIG. 10 is a view of the clamping means illustrated in FIG. 8 but with a differently configured refractory tube held therein.

Turning next to FIG. 8 and to a more detailed description of the refractory tube 50 and the manner of mounting this tube 50 in the banjo frame 60, the upper end of refractory tube 50 defines an outwardly extending flange 50a, which flange has a downwardly facing surface 50b and a conically shaped locating surface 50c which surface mates with parts of an annular tube chucking means 72. The annular chucking means 72 is shown in FIGS. 8 and 10 for supporting refractory tube of different diameter and conceivably of different configurations entirely but with the same radially outwardly projecting flange 50a and with the same geometry for locating surfaces 150b and 150c.

The annular tube chucking means 72 more particularly comprises inner and outer annular parts 72a, 72b respectively which parts are received telescopically one inside the other and adapted to be axially clamped relative to one another by three threaded bolts 80, 80 each of which bolts has a head defining an eye 80a to permit hoisting the refractory tube and its associated clamping means out of its position in the spout bowl (FIG. 1) and/or to facilitate transporting the tube from and to a work area. It will be apparent that several such clamping means may be provided in assembled relationship with several different size refractory tubes such as indicated 50 and 150 at FIGS. 8 and 10. This preassembled configuration will faciliate the removement for replacement of a refractory tube in operational position as depicted in the drawings.

Figure 3:
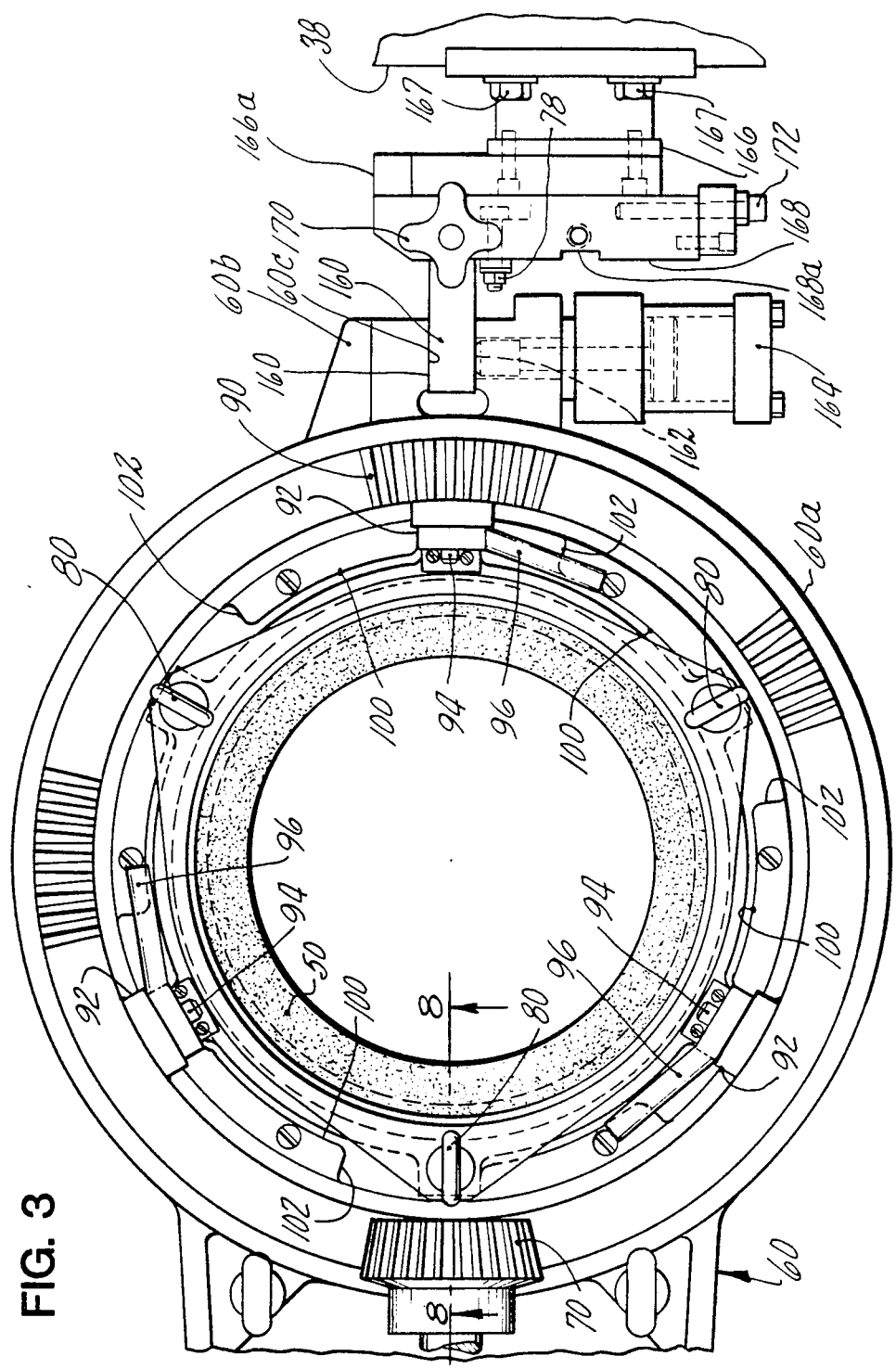
FIG. 3 is a plan view showing in some detail a portion of the refractory tube chucking and rotating mechanism together with the clamping means provided for securing the tube support mechanism in its active position.
Figure 9:
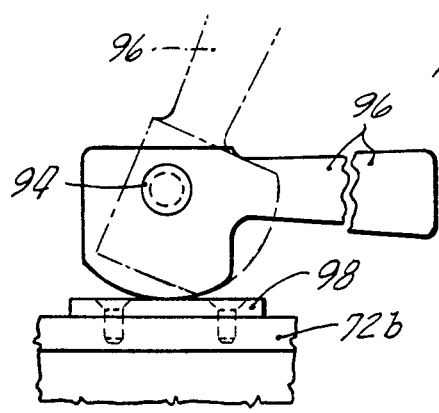
FIG. 9 is a detailed view of one of the three clamps used to secure the refractory tube and chucking means in the pivotally mounted frame.
Figure 11:
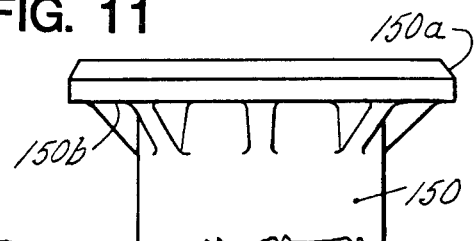
FIG. 11 is a side elevational view of the upper portion of the refractory tube shown in FIG. 10.
Figure 12:
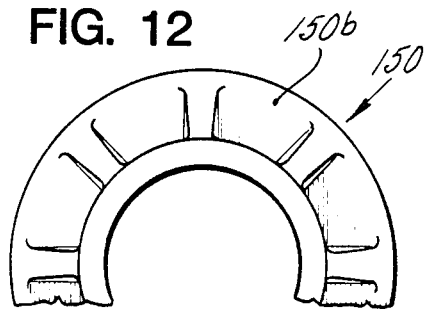
FIG. 12 is a bottom plan view of the refractory tube illustrated in FIGS. 10 and 11.

The three I-bolts 80, 80 are arranged in circumaxially spaced relationship as best shown in FIG. 3 so that the refractory tube and associated clamping means are effectively balanced when the assembly is to be removed or inserted in the position shown. A bayonet type joint is provided for securing the refractory tube and clamping means in place, and FIG. 3 illustrates this bayonet joint to best advantage. Bevel gear 70 meshes with annular ring gear 90 so that the refractory tube and its associated clamping means 72 can be continuously rotated with respect to the frame 60 in which it is mounted. The ring gear 90 has three circumaxially spaced inwardly projecting bosses 92, 92 each of which bosses carries a radially inwardly projecting stub shaft 94, 94. Each such stub shaft 94 carries a pivotably mounted cam defining lever 96 best shown in FIG. 9 which lever is movably from the lock position shown in solid lines in that view to a release position illustrated in phantom lines in FIG. 9. When the levers 96, 96 have been moved to the release position the operator can rotate the refractory tube and associated annular clamping means 72 from the position shown in FIG. 3 to a position angularly spaced in a clockwise position relative thereto with the result that the refractory tube and clamping means 72 can be removed from the position shown to be transported to a work area or the like. As best shown in FIG. 9 three hardened steel wear plates 98 120 degrees apart are provided on tube chuck 72b for engagement with the cam end of the lever 96 for achieving this locking function. These plates can be replaced as working of the cam levers wear the plates. Recesses 100 are defined in the outside diameter of tube chuck 72b of the annular clamping means so as to be slidable inside of upper bearing race 110. Projecting lands 102, 102 on the inner diameter of the ring gear 90 allow the ring gear 90 to be bolted to upper race 110 and also cooperate therewith to achieve the bayonet joint locking feature.

As mentioned previously the banjo frame 60 has a head end portion defining an opening for receiving the refractory tube and its chucking means, and FIG. 8 illustrates the bearing which rotatably supports the refractory tube chucking means 72 and associated ring gear 90 which the clamping means is secured as described above. The frame 60 defines a circular opening 60a in which opening there is provided an annular bearing support 104 of generally rectangular cross section. The bearing support 104 has a plurality of circumaxially spaced graphite inserts 106 which are pinned to the support 104 as indicated generally by the pin 108 in FIG. 8. An annular upper race 110 is secured to the lower surface of ring gear 90 with its downwardly and outwardly facing surfaces 110a defining or coated with an anti-friction material so as to enage the related upwardly and inwardly facing surfaces of the graphite inserts 106 to provide a bearing to rotatably support the refractory tube, its annular clamping mechanism 72, and the ring gear 90. As so constructed and arranged rotation of the bevel gear 70 causes corresponding rotation of the ring gear 90 and hence of the upper race 110, and associated clamping means 72 and refractory tube 50. Retaining ring 111 is provided to prevent the entire upper race/ring gear from lifting as the tube is seated against the annular seat defined inside the spout bowl.

Figure 2:
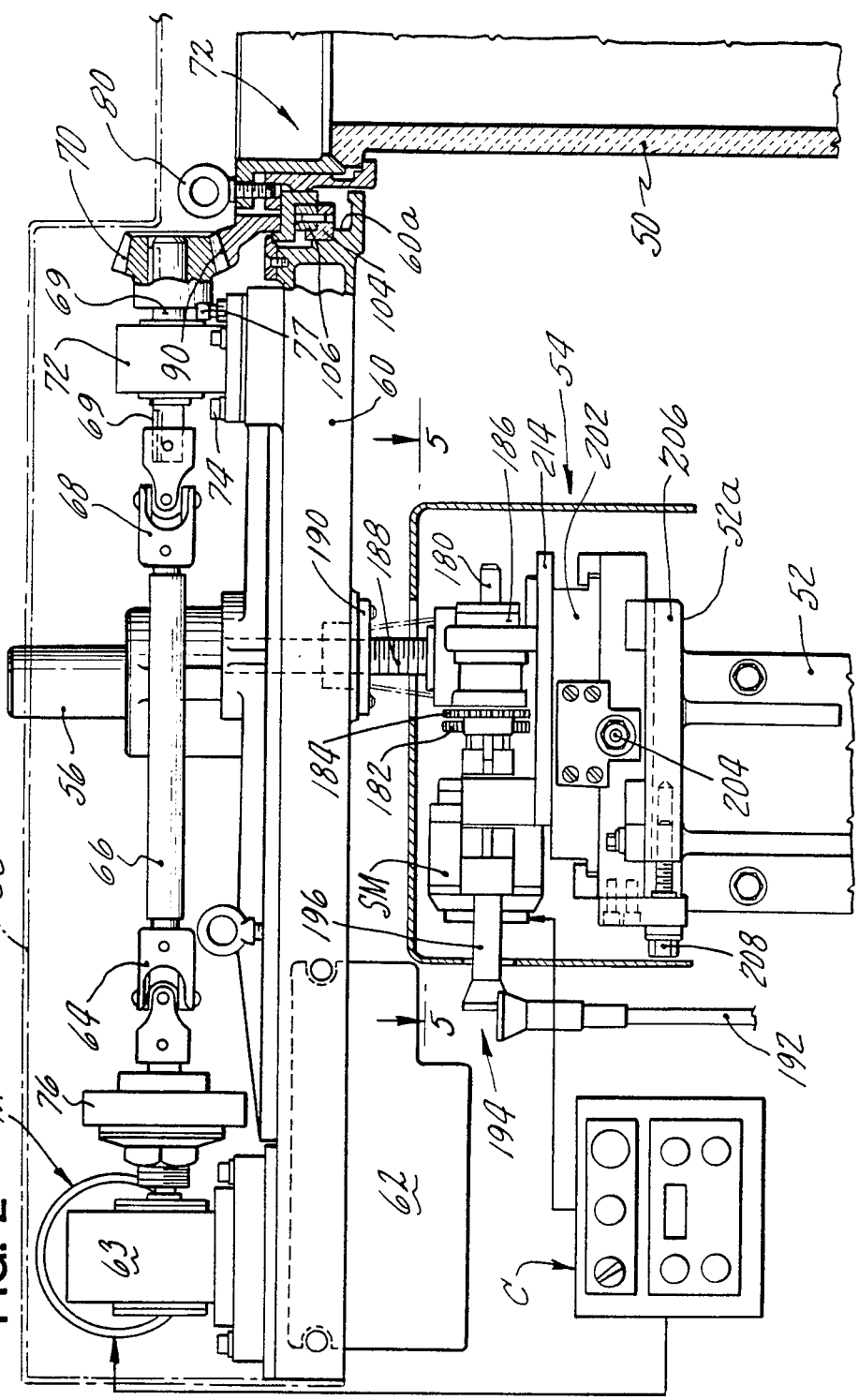
FIG. 2 shows a more detailed front elevational view of a portion of FIG. 1, again partly in section, and with the cover illustrated in phantom lines, this view also revealing in schematic fashion the control for the electric stepping motor and for the refractory tube rotating motor.

The bevel gear 70 is driven through the drive shaft means 64, 66 and 68 through a right angle drive unit 63 from the motor M as mentioned previously. More particularly the gear 70 is keyed to a shaft 69 which shaft is inturned journalled in a bearing assembly 72 bolted to the banjo frame 60 as indicated generally at 74, 74. Four levelling bolts 77 are provided to obtain optimal backlash between gear 70 and ring gear 90. Four bolts 74 are also provided to lock the position of bearing assembly 72. This feature thus allows for gear backlash readjustment as gear teeth wear. The degree of adjustment of the bearing box 72 relative the frame 60 is such that a flexible drive system 64, 66 and 68 is preferably provided between the output of gear reducer 63 and the shaft 69. While univeral joints 64 and 68 are shown in FIG. 2 for accomplishing this flexible coupling connection other equivalent flexible couplings might be utilized to rotate gear 70 from the motor M at the opposite end of the frame. An override clutch 76 is provided between the flexible coupling means and the motor M so as to provide slippage at a predetermined torque in order to avoid damage to either the refractory tube or the spout bowl. Motor M is controlled from a remote location and more particularly at controller C.

Still with reference to FIG. 3, banjo frame 60 includes a generally circular head portion 60a which defines the opening for receiving the tube 50 and its associated clamping means 72. At the right hand end portion of banjo frame 60 a lug 60b is provided as shown in FIG. 3 and this lug 60b defines a vertically extending slot 60c in which slot a Y bar 160 is provided. The slot 60c has one side defined by the lug 60b and the opposite side defined by a movable clamp 162 such that the bar 160 can be clamped in the position shown by air cylinder 164. Bar 160 has a lower portion 160a best shown in FIG. 1, which lower portion 160a is clamped to slide block 168. As shown in FIG. 3 several bolts 167, 167 anchor the bracket 166 to the fixed structure 38 associated with the housing for the plunger operating mechanism described previously. Bolted to bracket 166 is slide way 166a extending in the X direction and adapted to receive slide block 168. The slide block 168 receives the Y bar 160 and includes clamping means in the form of knob 170. Some adjustability is provided for the location of the Y bar relative to the banjo frame 60 and this adjustment is preferably provided by loosening locking bolt 78 and rotating adjustment screw 172, capable of achieving limited movement in the X direction of slide 168 relative to slide way 166a on fixed bracket 166. The additional notch 168a in cross slide 168 provides a convenient means for relocating Y bar 160 in the event that minor adjustments with the adjusting screw 172 are inadequate to align the refractory tube 50 with its annular seat and with respect to the orifices defined in the lower portion of the spout bowl.

Figure 13:
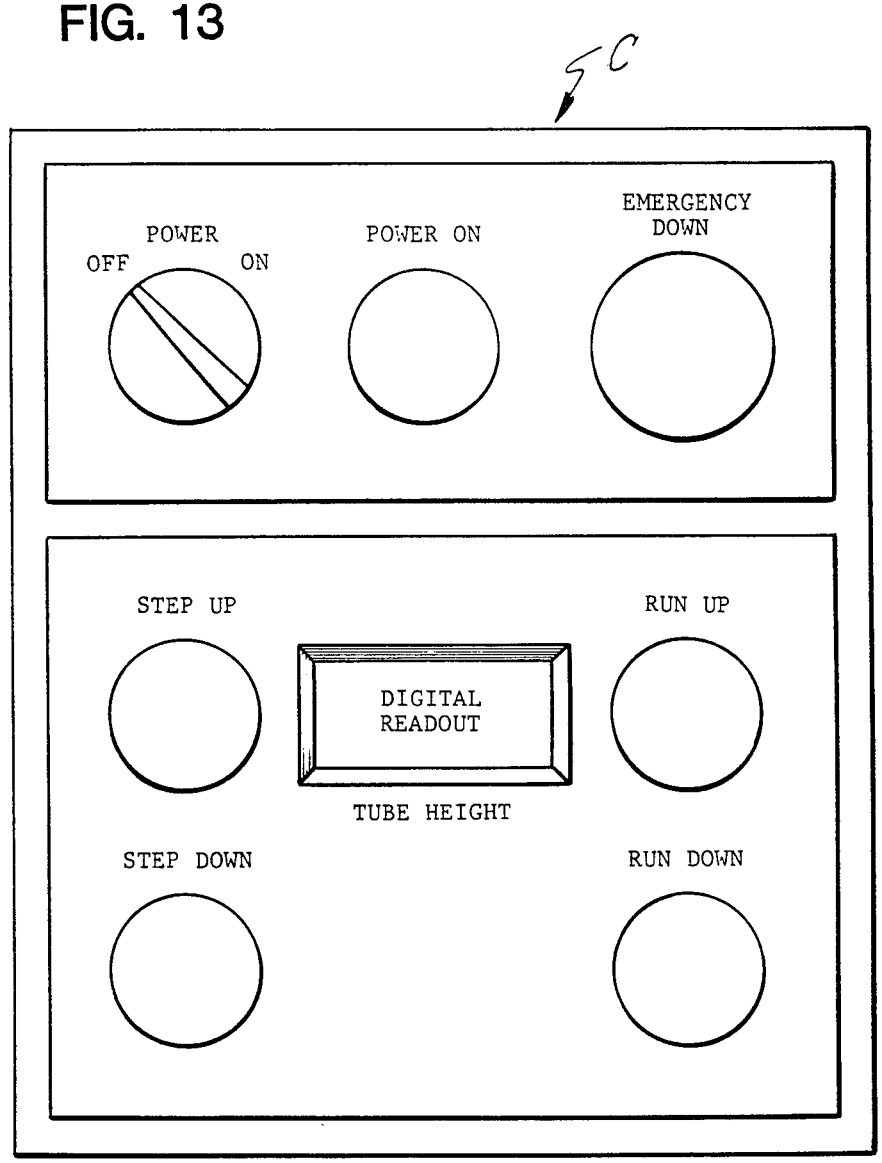
FIG. 13 is a detailed view of the controller shown in FIG. 2.

Turning now to a brief description of the operation of the apparatus described herein, and referring more particularly to FIG. 2, means is provided for controlling operation of the electric motors SM and M referred to previously, and such control means is illustrated in the form of controller C in FIG. 2. Motor M serves to continuously rotate refractory tube 50 through the drive means 64, 66 and 68 referred to previously. Controller C also serves to raise and lower refractory tube 50 toward and away from the annular seat defined inside the spout bowl 28 in order to regulate the flow of glass to the orifices defined in the lower portion of the spout bowl. A digital readout display is provided on the control panel (FIG. 13) of controller C and allows the flow of molten glass to be conveniently reestablished following feeder shutdown. The following series of steps can be used to benefit from this feature of the invention:

(a) setting an initial frame and corresponding tube height at the beginning of a period of operation for the feeder mechanism, (b) altering the frame height during operation of the feeder mechanism over a period of time to regulate the mass flow rate of the molten glass, which tube height may have changed due to wear at the lower end of the refractory tube itself, (c) running the frame down until the lower end of the tube seats inside the feeder bowl to stop the flow of glass, (d) reading the display at the start (step a) and after so closing off the glass flow to provide two digital readout numbers, (e) adding said numbers to provide a third member, (f) using the added or third number to set up the feeder mechanism during a subsequent period of operation.

Figure 5:
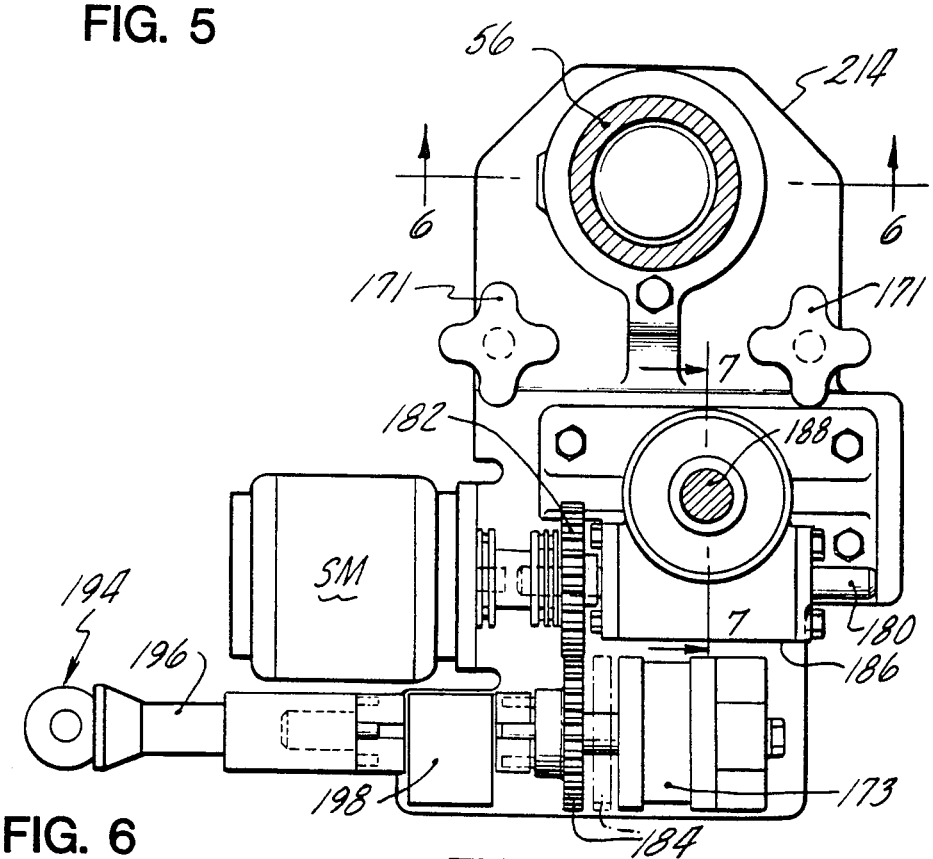
FIG. 5 is a horizontal sectional view taken generally on the line 5—5 of FIG. 2.
Figure 7:
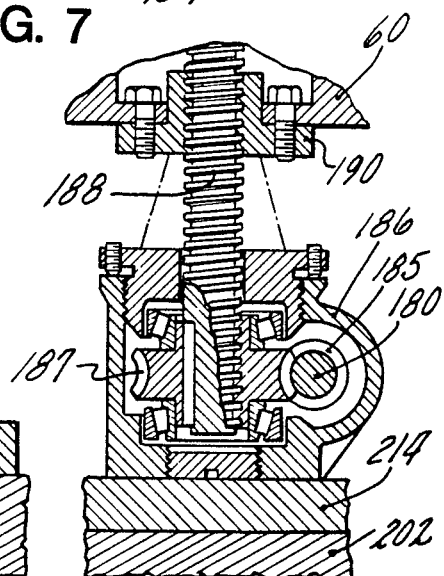
FIG. 7 is a vertical sectional view taken generally on the line 7—7 of FIG. 5.

Stepping motor SM is shown to best advantage in FIG. 5 wherein this stepping motor serves to rotate cross shaft 180, which cross shaft carries a gear 182 which is shown in enagement with a second gear 184. However, these gears would normally be out of engagement with one another, thus output shaft of stepping motor SM would normally rotate shaft 180 without turning gear 184. A gear box 186 houses a worm gear (See FIG. 7) so as to rotate a vertically extending jack screw 188. FIGS. 2 and 7 illustrate the jack screw 188 threadably received in a captive nut 190 provided for this purpose in the frame 60. Thus, incremental rotation of the stepping motor SM and its associated output shaft 180 achieves predetermined vertical motion for the banjo frame 60 and hence also limited vertical motion of the refractory tube 50. All of this is accomplished without interfering with the normal rotation of the refractory tube 50 via continuous rotation of the motor M as decribed above.

The refractory plungers must first be removed in accordance with the teaching of the prior filed and still pending patent application dealing with that subject before the refractory tube is removed as described hereinafter.

Refractory tube 50 with clamping device 72 is released from its position inside the head of the banjo frame 60 by rotating the clamps 96 decribed previously with reference to FIG. 9 so as to permit the refractory tube assembly to be rotated slightly about its vertical axis and be, as a result, free to be lifted by means of eye-bolts 80, 80 upwardly out of the banjo frame. This operation provides the refractory tube 50 with the clamping device 72 still associated and assembled therewith in a position free of the spout bowl and of the banjo frame 60.

In order to pivot banjo frame 60 as shown in FIG. 4, the refractory tube chucking means must first be removed as described above. It is then necessary to remove Y bar 160 from its position in slot 60c defined for this purpose in the banjo frame 60. The next step would entail removing manual input member 194 associated with manually raising and lower the refractory tube as described above. The operator would then remove the front panel of enclosure 54 associated with the support structure and the hand knobs 171 in FIG. 5 so as to permit swinging of the banjo frame 60 from the position shown in full lines in FIG. 4 to that illustrated in phantom lines in that view. The single pivot post 56 for the entire structure facilitates movement of the banjo frame from its active position to a position where it is clear of the spout bowl to permit work to be done on the feeder bowl itself.

Figure 6:
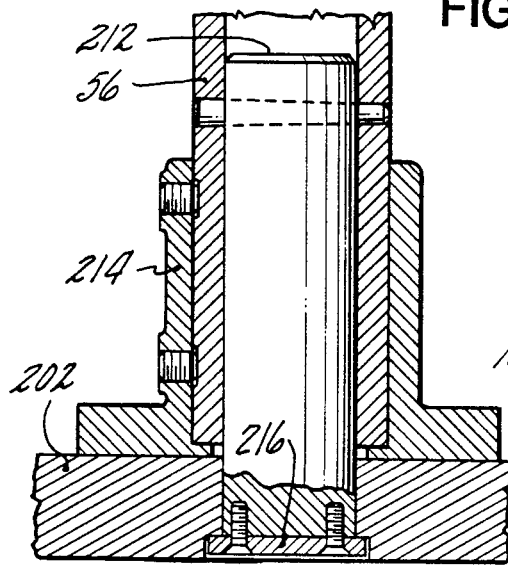
FIG. 6 is a vertical sectional view taken on the line 6—6 of FIG. 5.

Means is provided for manually raising the refractory tube 50 or for lowering the tube when necessary to achieve flow of or interrupt the flow of molten glass from the orifices in the feeder bowl. Such means comprises a depending shaft 192 carrying a hand crank (not shown) and coupled to manual input drive shaft 196 through a right angle gear coupling arrangment 194. This shaft 196 is normally disengaged from driving engagement with cross shaft 180 referred to previously, and it will be necessary to engage the gears 182 and 184 by activating air cylinder 173 into the position shown in FIG. 5 in order to achieve rotation of cross shaft 180 and hence of the jack screw 188. Actuator 173 comprises an alternate means for achieving this limited axial motion of gear 184. Gear 184 is shown in a phantom line position in FIG. 5 to illustrate its normal position. The full line position shown for gear 184 in FIG. 5 being such as to permit manual rotational motion for the jack screw 188. FIG. 7 illustrates the jack screw 188, gear box housing 196, and also shows worm 185 journalled on cross shaft 180 and in position for meshing with a worm gear 187 provided for this purpose on the jack scew 188. The captive nut 190 provided in the frame 60 is also shown in FIG. 7. This entire mechanism for raising and lowering the banjo frame 60 is provided on support casting 214. Support casting 214 is secured to a first cross slide 202 capable of moving in the X direction as a result of adjustments made to a threaded screw 204 provided for this purpose in a second cross slide to 206 itself capable of movement in the Y direction as a result of adjustments made to a second adjustment screw 208 threaded directly into bracket 52. As so constructed and arranged the support casting 214 and its associated first cross slide 202 can be properly located in a horizontal plane in both the X and Y directions in order to properly locate the banjo frame 60 and refractory tube 50 relative to the fixed structure generally and the spout bowl in particular. Shaft 56 is shown in FIG. 6 as comprising a tubular member supported at its lower end by a vertically extending stub shaft 212 which stub shaft is secured to an upwardly open support casting 214 provided for this purpose on slide 202. The lower end of stub shaft 212 carries a circular plate 216 which plate 216 is contained in a counterbore on the underside of the first slide 202. It will be apparent that the support for pivot post 56 and its associated stub shaft 212 extends into and is supported by the cross slide 202. Thus, the entire support structure for the refractory tube 50 can be located in the X and Y directions in order to accommodate and to correct any misalignment between the axis of the refractory tube 50 and that of the lower end portion of the spout bowl defining the orifices. Naturally, this also permits achievement of adjustment for the refractory tube 50 relative to the plunger or plungers provided in the spout bowl as referred to previously.

As so constructed and arranged the refractory tube 50 and its associated clamping means 72 can be conveniently removed for replacement with refractory tubes of different size for example. Furthermore, the limited rotational movement of the banjo frame 60 and associated structure provide convenient access to the spout bowl itself and in addition, permit work to be done on the refractory tube support structure without work on the one interferring with work on the other.

We claim:

1. In a molten glass spout bowl mounted on fixed structure and defining one or more orifices through which molten glass is adapted to issue, and said spout bowl also including at least one vertically reciprocating plunger, the lower end of which plunger cooperates with the orifice defining means to aid in the flow of glass through such orifices, the improvement comprising at least one refractory tube surrounding the plunger and having an upper end above the spout bowl, said tube having a lower end adapted to mate with an annular seating surface inside the spout bowl to interrupt the flow of glass to the orifice defining means, a horizontally extending frame for supporting said refractory tube, a vertically extending pivot post for said frame, support structure associated with the fixed structure of the glass forehearth and supporting said frame for at least limited horizontal swinging movement on the axis of said pivot post to and from an active position wherein said tube is so supported inside the spout bowl, clamping means defined in part on fixed structure associated with said glass forehearth and in part on said frame to hold said frame in said active position, means for moving said frame down and up relative to said support structure to move the tube lower end toward and away, respectively, from the seating surface defined inside said spout bowl.

2. The combination defined by claim 1 further characterized by annular tube chucking means in said frame, said tube having an integrally formed radially outwardly extending flange adjacent its upper end, and said flange having a conically shaped locating surface defined thereon, said chucking means comprising inner and outer annular parts, one of which parts has a conical locating surface adapted to mate with that on said tube flange, and said chucking means including means for axially clamping said inner and outer tube chucking means parts.

3. The combination defined by claim 1 wherein said means for moving said frame vertically comprises a jack screw rotatably mounted in said support structure and a captive nut in said frame, said jack screw threadably received in said captive nut, and said means for so moving said frame comprising reversible drive means for rotating said jack screw.

4. The combination defined by claim 1 wherein said support structure for said pivot post comprises a second horizontally extending way defining means secured to said fixed forehearth structure, a second slide adjustably mounted on said second way defining means for movement in a second horizontal direction, said slide defining a first horizontally extending way defining means perpendicular to the second, and a first slide adjustably mounted on said first way defining means for movement in a first horizontal direction perpendicular said second horizontal direction.

5. The combination defined by claim 4 wherein said first slide supports said pivot post, said means for moving said frame being mounted on said first slide.

6. The combination defined by claim 5 wherein said means for moving said frame vertically comprises a jack screw rotatably mounted on said first slide, and a captive nut in said frame, said jack screw threadably received in said captive nut, and said means for so moving said frame comprising reversible drive means for rotating said jack screw, said reversible drive means including an electrically operated stepping motor.

7. The combination defined by claim 6 further characterized by annular tube chucking means in said frame, said tube having integrally formed radially outwardly extending flange adjacent its upper end, and said flange having a conically shaped locating surface defined thereon, said chucking means comprising inner and outer annular parts, one of which parts has a conical locating surface adapted to mate with that on said tube flange, and said chucking means including means for axially clamping said inner and outer parts.

8. The combination defined by claim 2 further characterized by at least one additional tube of diameter different from said first mentioned tube, said additional tube also having a radially outwardly extending flange adjacent its upper end, both flanges on both tubes having identical conically shaped locating surfaces of the same size and having identical flanges so that both said tube can be held in identical chucking means without requiring chucking means of alternative size to accommodate tubes of different diameter.

9. The combination defined by claim 2 wherein said frame includes annular bearing means for rotatably supporting said tube chucking means for rotation on its vertical axis, a ring gear on said annular bearing means, motor means provided on said frame and located adajcent the frame and opposite said one end, drive shaft means coupling said motor means to said ring gear.

10. The combination defined by claim 8 wherein said frame includes annular bearing means for rotatably supporting said tube chucking means for rotation on its vertical axis, a ring gear on said annular bearing means, motor means provided on said frame and located adjacent the frame end opposite said one end, a drive shaft means coupling said motor means to said ring gear.

11. The combination defined by claim 1 wherein said clamping means comprises a first horizontally extending way defining means defined on said fixed structure and a first slide block provided on said first way defining means, said first slide block being adjustably movable on said first way, a Y-bar mounted to said slide block and extending through a slot defined for it in said frame, and a fluid actuator having a Y-bar engageable first portion, a second actuator portion mounted to said frame, said first actuator portion movable relative to said second actuator portion to clamp said Y-bar in said slot.

12. The combination defined by claim 11 further characterized by annular tube chucking means in said frame, said tube having an integrally formed radially outwardly extending flange adjacent its upper end, and said flange having a conically shaped locating surface defined thereon, said chucking means comprising inner and outer annular parts, one of which parts has a conical locating surface adapted to mate with that on said tube flange, and said chucking means including means for axially clamping said inner and outer tube chucking means parts.

13. The combination defined by claim 11 wherein said means for moving said frame vertically comprises a jack screw rotatably mounted in said support structure and a captive nut in said frame, said jack screw threadably received in said captive nut, and said means for so moving said frame comprising reversible drive means for rotating said jack screw.

14. The combination defined by claim 11 wherein said support structure for said pivot post comprises a second horizontally extending way defining means secured to said fixed forehearth structure, a second slide adjustably mounted on said second way defining means for movement in a second horizontal direction, said slide defining a first horizontally extending way defining means perpendicular to the second, and a first slide adjustably mounted on said first way defining means for movement in a first horizontal direction perpendicular said second horizontal direction.

15. The combination defined by claim 14 wherein said first slide supports said pivot post, said means for moving said frame being mounted on said first slide.

16. The combination defined by claim 15 wherein said means for moving said frame vertically comprises a jack screw rotatably mounted on said first slide, and a captive nut in said frame, said jack screw threadably received in said captive nut, and said means for so moving said frame comprising reversible drive means for rotating said jack screw, said reversible drive means including an electrically operated stepping motor.

17. The combination defined by claim 16 further characterized by annular tube chucking means in said annular bearing, said tube having integrally formed radially outwardly extending flange adjacent its upper end, and said flange having a conically shaped locating surface defined thereon, said chucking means comprising inner and outer annular parts, one of which parts has a conical locating surface adapted to mate with that on said tube flange, and said chucking means including means for axially clamping said inner and outer parts.

18. The combination defined by claim 17 further characterized by at least one additional tube of diameter different from said first mentioned tube, said additional tube also having a radially outwardly extending flange adjacent its upper end, both flanges on both tubes having identical conically shaped locating surfaces of the same size and having identical flanges so that both said tube can be held in identical chucking means without requiring chucking means of alternative size to accommodate tubes of different diameter.

19. The combination defined by claim 17 wherein said frame includes annular bearing means for rotatably supporting said tube chucking means for rotation on its vertical axis, a ring gear on said annular bearing, motor means provided on said frame and located adajcent the frame and opposite said one end, drive shaft means coupling said motor means to said ring gear.

20. The combination defined by claim 17 further characterized by alternative means for moving said frame vertically, said alternative means comprising a first gear driven by said reversible drive means, a second gear, and means for moving said second gear into and out of engagement with said first gear so that said first gear and said drive means can be selectively operated to permit moving said tube in the absence of power for operating said stepping motor.

21. The combination defined in claim 2 wherein said inner and outer parts having cylindrical portions fitted one inside the other, said outer cylindrical portion fitting snugly inside the complementary shaped cylindrical surface defined in said frame.

22. The combination defined in claim 21 wherein said frame includes annular bearing means for rotatably supporting said tube chucking means for rotation on its vertical axis, a ring gear on said annular bearing means, motor means provided on said frame and located adjacent the frame and opposite said one end, drive shaft means coupling said motor means to said ring gear, said bearing means having upper and lower rings, said upper ring defining said cylindrical complementary surface for engagement with said outer chucking means part.

23. The combination defined in claim 22 wherein said bearing means comprises graphite bearing segments spaced circumaxially around said lower bearing ring with said upper bearing ring plasma coated to improve wear resistance.

24. The combination defined in claim 20 wherein said means for selectively operating said jack screw in the absence of stepping motor power comprises a fluid actuator and clutch, and means normally holding said actuator in position to release said clutch, said clutch serving to couple said alternative means to said drive means and rotate said jack screw.

25. The combination defined in claim 9 wherein said drive shaft means coupling said motor to said ring gear comprises a pinion gear and a flexible shaft provided between said pinion gear and said motor means, and an adjustably mounted pillow block for at least that end of said flexible shaft adjacent said pinion gear.

26. The combination defined in claim 6 further characterized by display means for indicating in digital readout form a number corresponding to the height of said refractory tube support frame relative to said fixed structure including said annular seat in said spout bowl.

27. The combination defined in claim 9 wherein one of said annular parts of said chucking means includes a plurality of circumaxially spaced upwardly facing cam plates, and wherein said ring gear defines a plurality of circumaxially spaced radially extending rock shaft cam levers pivotably mounted on said radially extending rock shaft so that each of said cam levers is adapted to engage one of said cam plates provided for this purpose on the annular part of said tube chucking means.

28. The combination defined in claim 27 wherein said means for axially clamping said inner and outer tube chucking parts comprises threaded eye-bolts oriented parallel the tube axis and provided in circumaxially spaced relationship on said annular tube chucking means, said eye-bolts and cam levers being spaced circumaxially relative to one another, and said tube and its associated chucking means comprising a subassembly which can be removed from its position inside said ring gear by first releasing said cam levers and then rotating said subassembly relative to said ring gear so as to permit removal of the tube and its associated chucking means by lifting the eye-bolts vertically relative to said ring gear and its associated annular bearing means.

29. A method for operating a feeder mechanism of the type having a refractory tube and adapted to issue glass from orifices in the outlet spout of a feeder bowl, said method comprising the steps of
 (a) positioning the refractory tube in the bowl at an elevation such that a desired glass flow is attained,
 (b) supporting the tube for movement toward and away from the feeder bowl outlet,
 (c) moving the tube down until the lower end of the tube seats inside the feeder bowl to stop the flow of glass,
 (d) automatically recording the tube position at the start (step a) and after so closing off the glass flow to provide two digital signals,
 (e) algebraically adding said digital signals to provide a third digital signal,
 (f) using the added or third digital signal to set up the feeder mechanism during a subsequent period of operation.

* * * * *